US012756139B2

(12) United States Patent
Anma et al.

(10) Patent No.: US 12,756,139 B2
(45) Date of Patent: Oct. 6, 2026

(54) CONNECTOR WITH ASSEMBLING PORTION COMPRISING PRESS-FIT GROOVE AND RIB

(71) Applicant: Yazaki Corporation, Tokyo (JP)

(72) Inventors: Hikaru Anma, Shizuoka (JP); Isao Kameyama, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 340 days.

(21) Appl. No.: 18/635,504

(22) Filed: Apr. 15, 2024

(65) Prior Publication Data

US 2024/0347966 A1 Oct. 17, 2024

(30) Foreign Application Priority Data

Apr. 17, 2023 (JP) ................................ 2023-067052

(51) Int. Cl.

*H01R 13/627* (2006.01)
*H01R 12/72* (2011.01)
*H01R 13/506* (2006.01)

(52) U.S. Cl.

CPC ....... *H01R 13/6272* (2013.01); *H01R 12/724* (2013.01); *H01R 13/506* (2013.01)

(58) Field of Classification Search

CPC ......................... H01R 13/6272; H01R 12/724; H01R 13/506; H01R 13/502; H01R 13/41; H01R 24/58; H01R 24/52; H01R 2103/00; H01R 2201/26; H01R 13/64

See application file for complete search history.

(56) References Cited

U.S. PATENT DOCUMENTS

| | | | | |
|---|---|---|---|---|
| 6,776,621 | B1 * | 8/2004 | Dye | H01R 24/50 439/63 |
| 7,794,274 | B2 * | 9/2010 | Phillips, Jr. | H01R 24/542 439/675 |
| 2011/0008999 | A1 * | 1/2011 | Annequin | H01R 24/54 439/582 |
| 2011/0217870 | A1 | 9/2011 | Blakborn | |
| 2019/0109420 | A1 | 4/2019 | Hasenohrl | |

FOREIGN PATENT DOCUMENTS

| | | |
|---|---|---|
| JP | 2012-508436 A | 4/2012 |
| JP | 2019-71272 A | 5/2019 |

* cited by examiner

*Primary Examiner* — Edwin A. Leon
(74) *Attorney, Agent, or Firm* — Sughrue Mion, PLLC

(57) ABSTRACT

A connector includes: a housing fittable to a mating housing; and an assembling member assembled to the housing via an assembling portion. The assembling portion includes: a press-fit groove arranged in one of the housing and the assembling member and extending along a fitting direction of the housing; and a rib arranged at the other of the housing and the assembling member, extending in the fitting direction of the housing, and press-fitted into the press-fit groove.

4 Claims, 6 Drawing Sheets

CONNECTOR WITH ASSEMBLING PORTION COMPRISING PRESS-FIT GROOVE AND RIB

CROSS-REFERENCE TO RELATED APPLICATIONS

The present application is based on and claims the benefit of priority from the prior Japanese Patent Application No. 2023-067052, filed on Apr. 17, 2023, the entire contents of which are incorporated by reference herein.

TECHNICAL FIELD

The present disclosure relates to a connector.

BACKGROUND

JP No. 2019-71272 A discloses a connector having a housing which can be fitted to a mating housing and a plug body as an assembling member which is assembled to the housing via a mechanical connection device as an assembling portion. The mechanical connection device has guide rails that are arranged at the housing and the plug body respectively and can engage with each other. The guide rails extend in a direction orthogonal to a fitting direction of the mating housing and the housing. Due to the guide rails extending in the direction orthogonal to the fitting direction, force generated when the housing is fitted or separated can be received by a mutually engaged part.

SUMMARY OF THE INVENTION

In the connector described above, if the force generated when the housing is fitted or separated is received by the guide rails, stresses that lay the guide rails are applied to proximal ends of the guide rails. If the strength of the housing and the assembling member is weak, the proximal ends of the guide rails may be damaged by the stresses, and an assembling state of the housing and the assembling member may become unstable.

The present disclosure is directed to a connector capable of stably maintaining an assembling state of a housing and an assembling member.

A connector in accordance with some embodiments includes: a housing fittable to a mating housing; and an assembling member assembled to the housing via an assembling portion. The assembling portion includes: a press-fit groove arranged in one of the housing and the assembling member and extending along a fitting direction of the housing; and a rib arranged at the other of the housing and the assembling member, extending in the fitting direction of the housing, and press-fitted into the press-fit groove.

According to the above configuration, it is possible to stably maintain an assembling state of a housing and an assembling member.

DETAILED DESCRIPTION OF THE INVENTION

Figure 1:
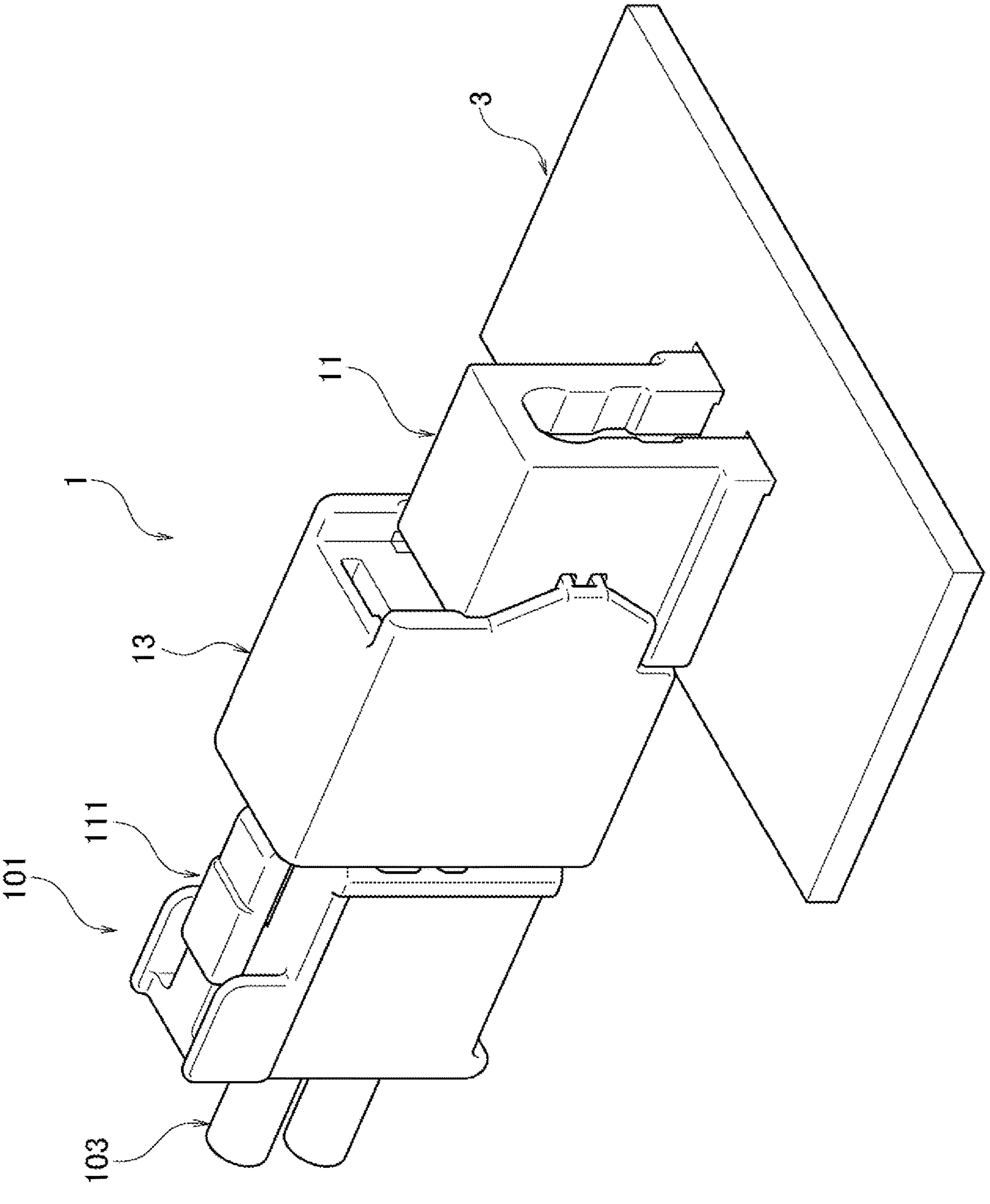
FIG. 1 is a perspective view when a connector according to an embodiment of the present invention is fitted to a mating connector.

Hereafter, a connector 1 according to an embodiment will be described in detail with reference to the drawings. Note that the dimensional ratios in the drawings are exaggerated for illustrative purposes and may differ from the actual ratios.

As illustrated in FIG. 1, the connector 1 according to the present embodiment is applied to a substrate 3 on which a circuit is formed and is electrically connected to the substrate 3, for example. The connector 1 can be fitted to a mating connector 101 which is electrically connected to a device or the like, for example. The substrate 3 and the device are electrically connected due to the connector 1 being fitted to the mating connector 101.

Figure 2:
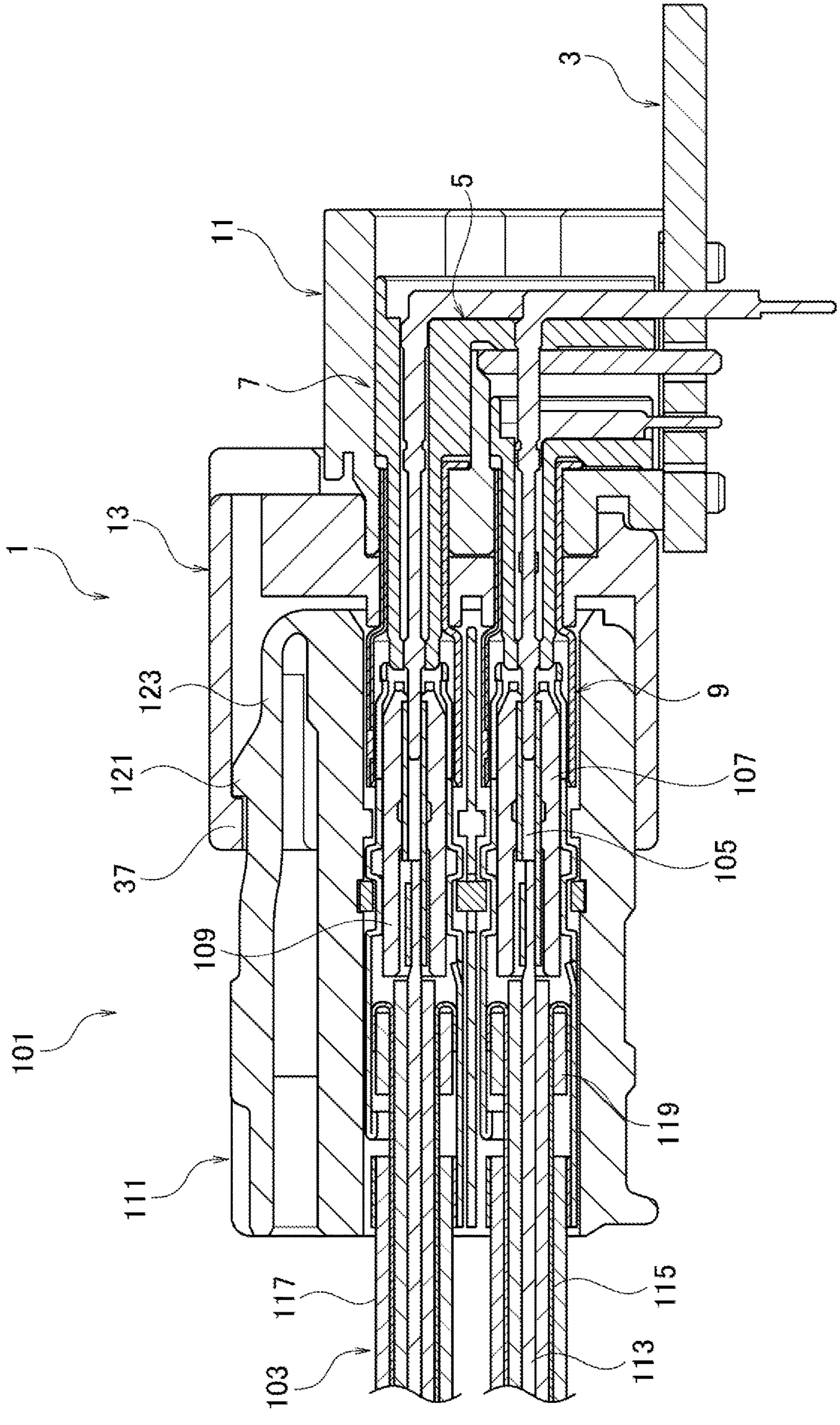
FIG. 2 is a cross-sectional view when the connector according to the present embodiment is fitted to the mating connector.

As illustrated in FIGS. 1 and 2, the mating connector 101 includes a mating inner terminal 105, a mating inner housing 107, a mating outer terminal 109, and a mating outer housing 111 as a mating housing, which are arranged at a terminal part of a shield wire 103.

A plurality of shield wires 103 (two in this case) are provided. Each of the shield wires 103 has an electric wire 113, a shield 115, and a sheath 117. The electric wire 113 has a core wire which is constituted by a plurality of twisted element wires made of conductive materials, and an insulating coating which is made of an insulating material and covers the outer periphery of the core wire. The shield 115 is constituted by braiding which is formed by braiding a plurality of element wires made of conductive materials, and is arranged to cover the outer periphery of the electric wire 113. The shield 115 may be constituted not only by the braiding but also by a metal foil or the like. The sheath 117 is made of an insulating material and is arranged to cover the outer periphery of the shield 115.

At the terminal part of the shield wire 103, first a prescribed length of sheath 117 is peeled off. Next, an annular metal sleeve 119 is arranged at the outer periphery of the exposed shield 115. Next, the shield 115 exposed from the metal sleeve 119 is bent toward the sheath 117 so as to cover the metal sleeve 119. Next, a prescribed length of insulating coating of the exposed electric wire 113 is peeled off, and the core wire of the electric wire 113 is exposed. The mating inner terminal 105 is electrically connected to the exposed core wire of the electric wire 113 of the shield wire 103 subjected to a terminal treatment, and the mating outer terminal 109 is electrically connected to the exposed shield 115.

A plurality of mating inner terminals 105 (two in this case) are provided in correspondence with the plurality of shield wires 103. Each of the mating inner terminals 105 is made of a conductive material and includes a female terminal having a cylindrical mating connection portion. Each mating inner terminal 105 is electrically connected to each electric wire 113 by crimping a crimping portion constituted by a press-fastening piece to a core wire of each electric wire 113. Each mating inner terminal 105 includes an elastically deformable locking lance. The mating inner housing 107 houses each mating inner terminal 105 electrically connected to each electric wire 113 of each shield wire 103.

A plurality of mating inner housings 107 (two in this case) are provided in correspondence with the plurality of mating inner terminals 105. Each of the mating inner housings 107 is made of an insulating material such as synthetic resin. Each mating inner housing 107 is formed into a cylindrical shape so as to be able to house each mating inner terminal 105, and includes therein an engaged portion to which a locking lance of each mating inner terminal 105 is engaged. By engaging a locking lance with an engaged portion, each mating inner terminal 105 is held by each mating inner housing 107. Each mating inner housing 107 is housed in each mating outer terminal 109 and maintains insulation between each mating inner terminal 105 and each mating outer terminal 109.

A plurality of mating outer terminals 109 (two in this case) are provided in correspondence with the plurality of mating inner housings 107. Each of the mating outer terminals 109 is made of a conductive material. Each mating outer terminal 109 is formed into a cylindrical shape so as to be able to house each mating inner housing 107. Engagement portions (not illustrated) are arranged between each mating outer terminal 109 and each mating inner housing 107 to engage with each other, and each mating inner housing 107 is held by each mating outer terminal 109 due to the engagement by the engagement portion. Each mating outer terminal 109 is electrically connected to each shield 115 by crimping a crimping portion constituted by a press-fastening piece to each exposed shield 115 of each shield wire 103.

The mating outer housing 111 is made of an insulating material such as synthetic resin. The mating outer housing 111 is formed into a housing shape so as to be able to house the plurality of mating outer terminals 109. The mating outer housing 111 has therein elastically deformable locking lances (not illustrated) which are engaged with the plurality of mating outer terminals 109. Each mating outer terminal 109 is held by the mating outer housing 111 by engaging with the locking lance. On one side of the mating outer housing 111, spacers capable of simultaneously engaging with the plurality of mating outer terminals 109 are assembled. By engaging each spacer with each mating outer terminal 109, each mating outer terminal 109 is doubly held by the mating outer housing 111. When each mating outer terminal 109 is housed in the mating outer housing 111, each shield wire 103 is drawn out of the mating outer housing 111.

The mating outer housing 111 can be fitted to an outer housing 13 of the connector 1. An elastically deformable lock arm 123 having a lock 121 is arranged at an upper part of the mating outer housing 111. When the mating outer housing 111 and the outer housing 13 are fitted, the lock 121 of the lock arm 123 is engaged with a locked portion 37 of the outer housing 13. By engaging the lock 121 with the locked portion 37, the mating connector 101 and the connector 1 are held in a fitted state. Fitting between the mating connector 101 and the connector 1 can be released by elastically deforming the lock arm 123 and releasing the engagement between the lock 121 and the locked portion 37.

As illustrated in FIGS. 1 to 8, the connector 1 is mounted on the substrate 3 on which a circuit is formed and is electrically connected to the substrate 3. The connector 1 includes an inner terminal 5, an inner housing 7, an outer terminal 9, a shield member 11 as an assembling member, and an outer housing 13 as a housing.

Figure 3:
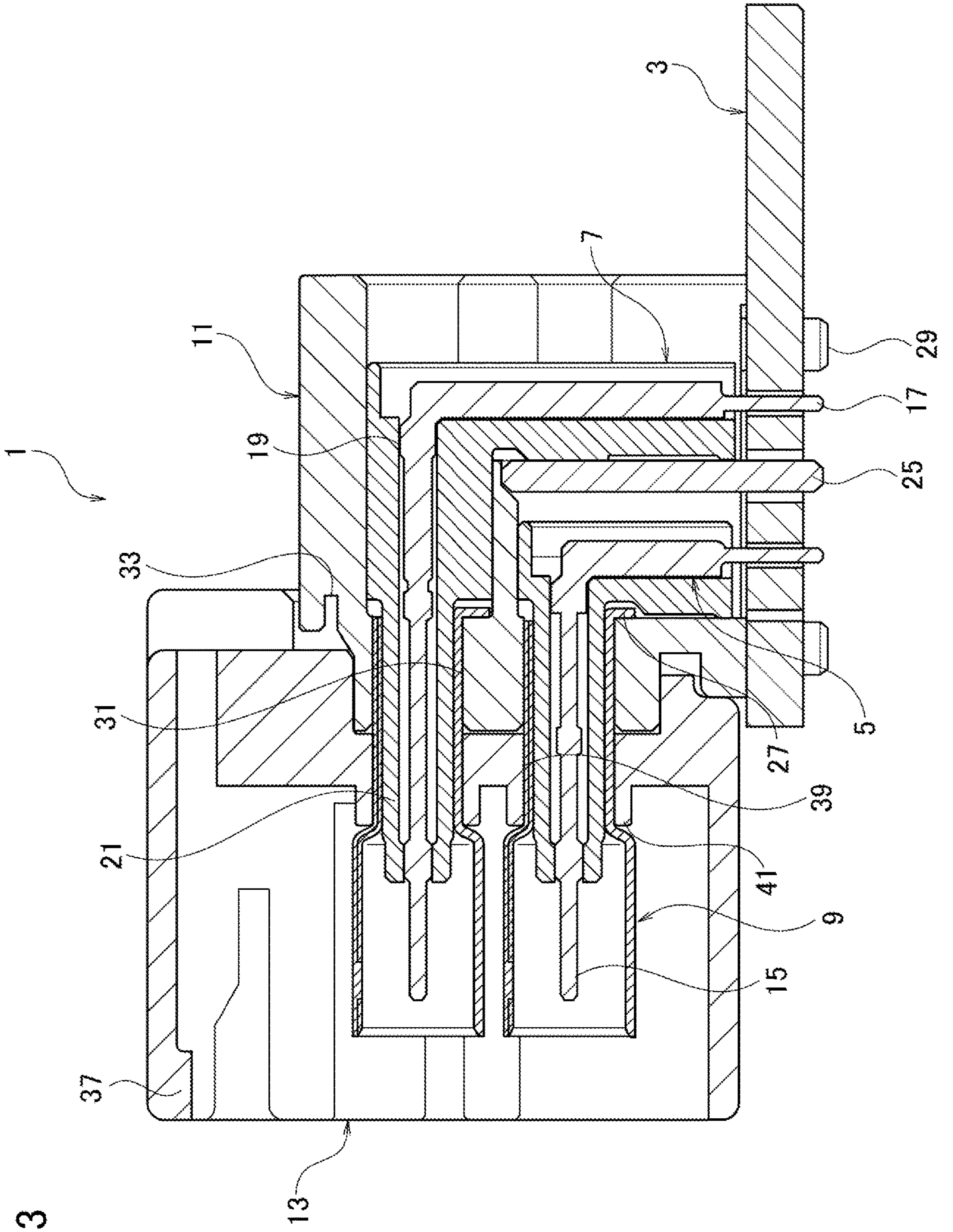
FIG. 3 is a cross-sectional view of the connector according to the present embodiment.
Figure 4:
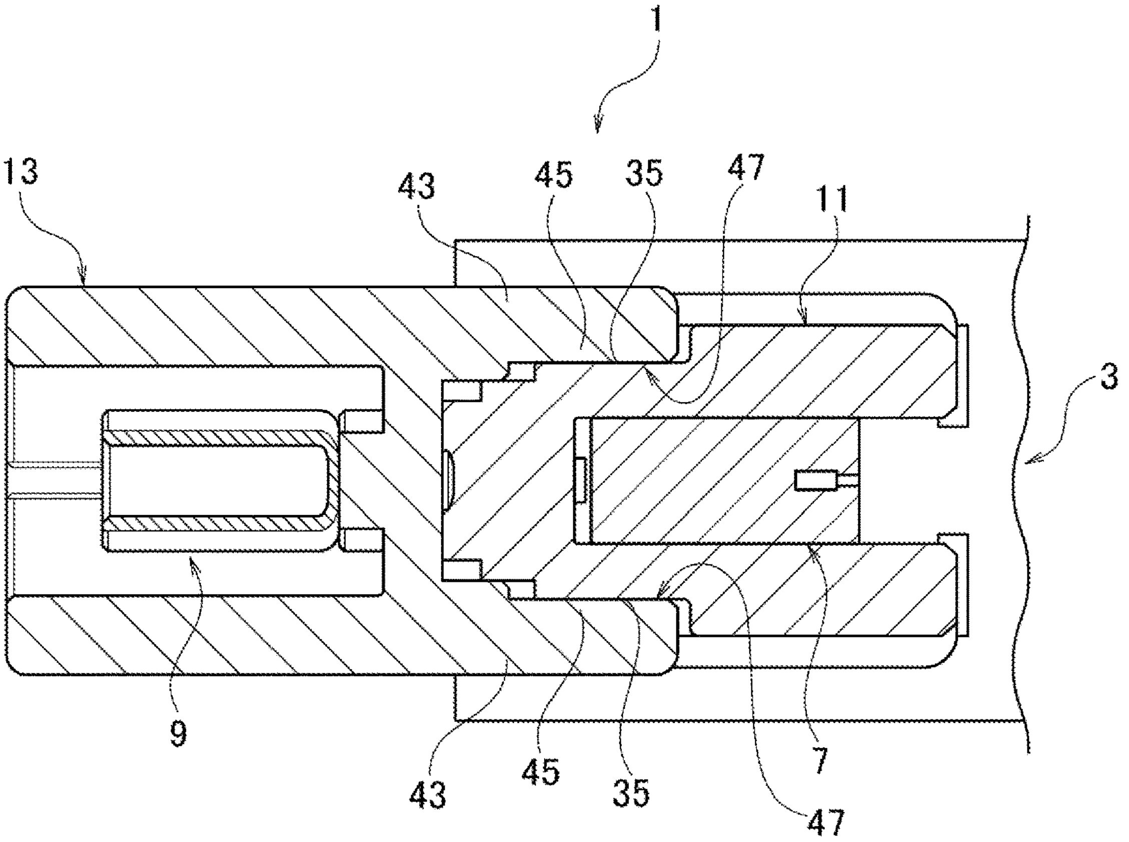
FIG. 4 is a cross-sectional view of the connector according to the present embodiment.
Figure 5:
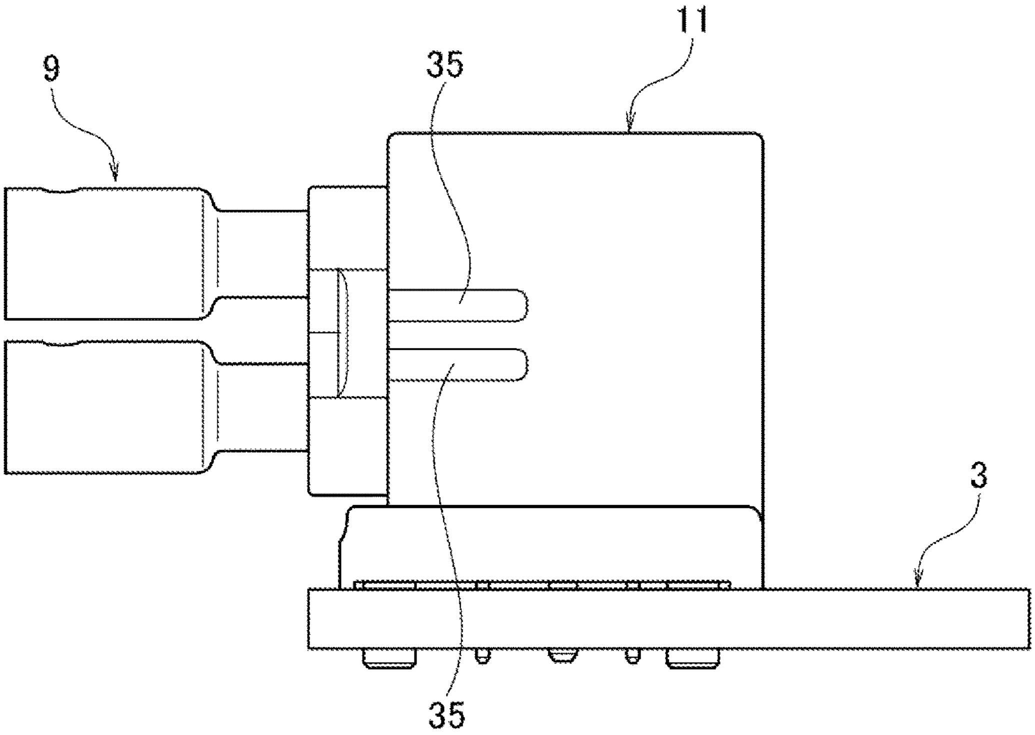
FIG. 5 is a side view of a shield member of the connector according to the present embodiment.
Figure 6:
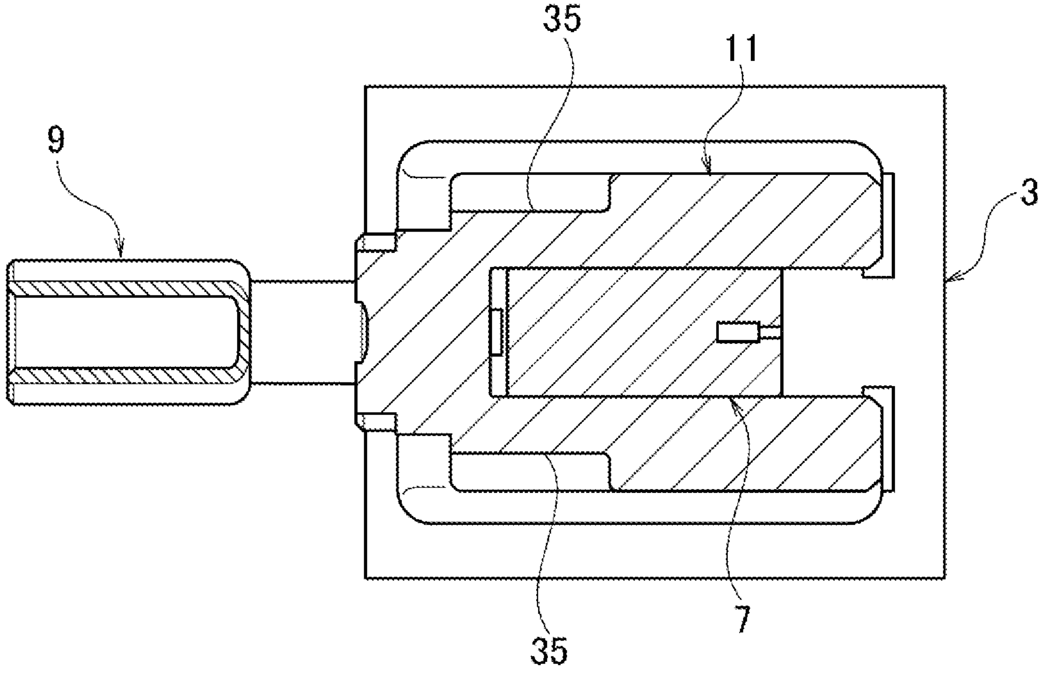
FIG. 6 is a cross-sectional view of the shield member of the connector according to the present embodiment.
Figure 7:
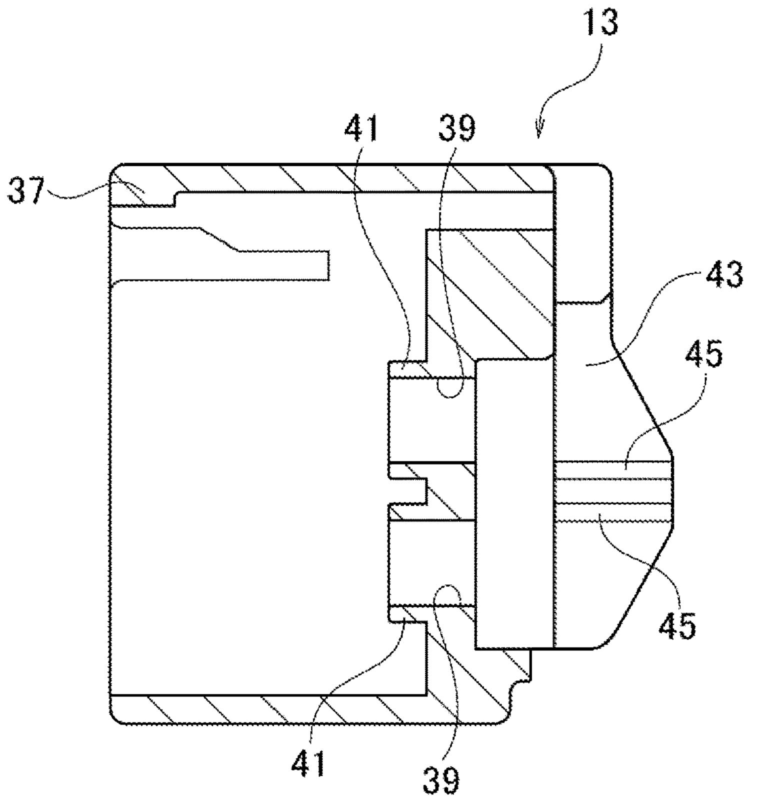
FIG. 7 is a cross-sectional view of an outer housing of the connector according to the present embodiment.
Figure 8:
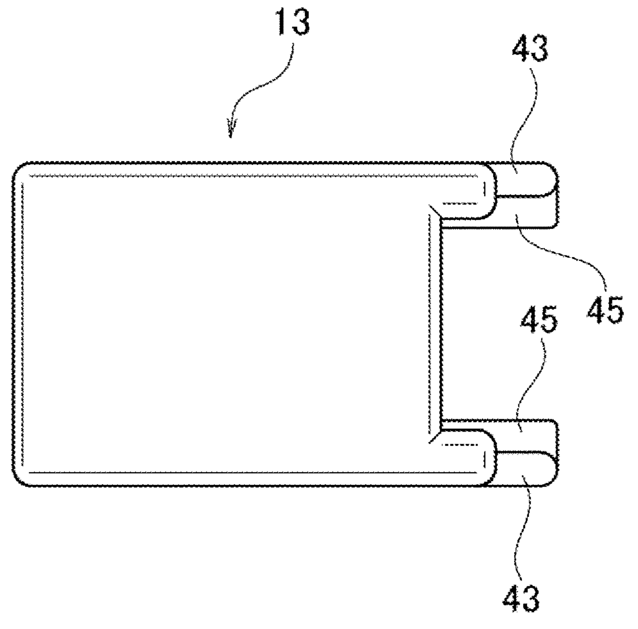
FIG. 8 is a top view of the outer housing of the connector according to the present embodiment.

As illustrated in FIGS. 2 and 3, a plurality of inner terminals 5 (two in this case) are provided in correspondence with the plurality of mating inner terminals 105. Each of the inner terminals 5 is made of a conductive material and is arranged on the substrate 3. Each inner terminal 5 is formed into an L-shape and has an inner connection portion 15, a substrate connection portion 17, and a press-fit portion 19.

The inner connection portion 15 extends along a plane direction of the substrate 3 to have a rod shape. An extension direction of the inner connection portion 15 is parallel to a fitting direction of the mating connector 101 and the connector 1. With the mating connector 101 and the connector 1 fitted, the inner connection portion 15 is inserted into a hole in the mating inner housing 107 and is fitted to the cylindrical mating connection portion of the mating inner terminal 105 so as to be inserted into the mating connection portion. By fitting the mating connection portion and the inner connection portion 15, the mating inner terminal 105 and the inner terminal 5 are electrically connected. When the mating inner terminal 105 and the inner terminal 5 are electrically connected, the device electrically connected to the mating connector 101 and the substrate 3 electrically connected to the connector 1 are electrically connected.

The substrate connection portion 17 is formed of a single member continuous with the inner connection portion 15. The substrate connection portion 17 extends vertically toward the substrate 3 by bending an end of the inner connection portion 15 toward the substrate 3. The substrate connection portion 17 is electrically connected to a conductive pattern of a circuit formed on the substrate 3 by means of soldering or the like, and accordingly the inner terminal 5 is electrically connected to the substrate 3.

The press-fit portion 19 is formed of a single member continuous with the inner connection portion 15 on the substrate connection portion 17 side of the inner connection portion 15. The press-fit portion 19 is a projection projecting outwardly from both side surfaces of the inner connection portion 15 in a width direction. The press-fit portion 19 is press-fitted against an inner surface of the inner housing 7, and the inner terminal 5 is fixed and held by the inner housing 7.

As illustrated in FIGS. 2 and 3, a plurality of inner housings 7 (two in this case) are provided in correspondence with the plurality of inner terminals 5. Each of the inner housings 7 is made of an insulating material such as synthetic resin. A part of the inner housing 7 in which the inner connection portion 15 and the press-fit portion 19 of the inner terminal 5 are housed is a cylindrical portion 21 which is formed into a cylindrical shape so as to expose a part of the inner connection portion 15 which is inserted into the mating connection portion. A part of the inner housing 7 in which the substrate connection portion 17 of the inner terminal 5 is housed is formed into a housing shape so as to cover areas of the substrate connection portion 17 other than an outer surface of the substrate connection portion 17 opposite to the inner connection portion 15. The inner housing 7 houses the inner connection portion 15 of the inner terminal 5 from an opening of the housing shape part toward the cylindrical portion 21. At this time, the press-fit portion 19 of the inner terminal 5 is press-fitted against an inner surface of the cylindrical portion 21, and the inner terminal 5 is held by the inner housing 7. Between the plurality of inner housings 7, a sealing member 25 is arranged which is made of a conductive material electrically connected to a ground pattern formed on the substrate 3 by means of soldering or the like. The cylindrical portion 21 of the inner housing 7 is housed in the outer terminal 9, and a part of the cylindrical portion 21 and the housing shape part are housed in the shield member 11. The inner housing 7 maintains insulation between the inner terminal 5 located inside, and the outer terminal 9 and the shield member 11 located outside.

As illustrated in FIGS. 2 to 6, a plurality of outer terminals 9 (two in this case) are provided in correspondence with the plurality of inner housings 7. Each of the outer terminals 9 is made of a conductive material. Each outer terminal 9 is formed into a cylindrical shape so as to be able to fit to each mating outer terminal 109 therein. On a side of each outer terminal 9 opposite to each mating outer terminal 109, each cylindrical portion 21 of each inner housing 7 is housed. An engagement portion (not illustrated) is arranged between each outer terminal 9 and each inner housing 7 to make the outer terminal 9 engage with the inner housing 7, and each inner housing 7 is held by each outer terminal 9 due to the engagement by the engagement portion. An extension direction of each outer terminal 9 is parallel to the fitting direction of the mating connector 101 and the connector 1. When the mating connector 101 and the connector 1 are fitted, each outer terminal 9 is fitted to each mating outer terminal 109 and is electrically connected to each mating outer terminal 109. When each mating outer terminal 109 and each outer terminal 9 are electrically connected, a shield circuit is formed. By forming the shield circuit, it is possible to prevent intrusion of noise or the like into the mating inner terminal 105 and the inner terminal 5 and leakage of noise or the like from the mating inner terminal 105 and the inner terminal 5. A locking portion 27 engaged with the shield member 11 is arranged on the inner housing 7 side of each outer terminal 9.

As illustrated in FIGS. 1 to 6, the shield member 11 is made of a conductive material and is arranged on the substrate 3. The shield member 11 is formed into a housing shape so as to be able to house the plurality of inner housings 7 therein. The opposite side of the outer housing 13 and the substrate 3 side of the shield member 11 are opened. On the substrate 3 side of the shield member 11, a plurality of fixing portions 29 (four in this case) are arranged which are fixed to holes of the substrate 3 by means of press-fitting or the like and protrude toward the substrate 3. By fixing the fixing portions 29 to the substrate 3, the shield member 11 is fixed to the substrate 3.

The shield member 11 includes a hole portion 31 through which the cylindrical portion 21 of the inner housing 7 and the outer terminal 9 are inserted. When the outer terminal 9 is inserted into the hole portion 31, a part of the outer terminal 9 fitted to the mating outer terminal 109 is exposed to the outside of the shield member 11. An inner surface of the hole portion 31 is in contact with an outer surface of the outer terminal 9. This electrically connects the shield member 11 and the outer terminal 9. The locking portion 27 of the outer terminal 9 is engaged with an opening edge of the hole portion 31 on an inner side of the shield member 11. After the outer terminal 9 is inserted into the hole portion 31, the locking portion 27 is bent so as to be engaged with the opening edge of the hole portion 31. By engaging the locking portion 27 with the opening edge of the hole portion 31, the outer terminal 9 is held by the shield member 11. Above the shield member 11, a holding portion 33 to which a grounding member (not illustrated) is assembled is arranged, the grounding member being grounded to a metal case for housing the connector 1, for example. Due to the grounding member assembled to the holding portion 33 being grounded, the shield member 11 and the outer terminal 9 are grounded.

A plurality of press-fit grooves 35 (two in this case) are arranged in outer surfaces of both side walls of the shield member 11 in the width direction. Each press-fit groove 35 extends along the fitting direction of the mating connector 101 and the connector 1. In the fitting direction of the connector 1 relative to the mating connector 101, a front side in the fitting direction of each press-fit groove 35 is opened and a rear side in the fitting direction of each press-fit groove 35 is closed. The outer housing 13 is assembled to the shield member 11 in which these kinds of the press-fit grooves 35 are arranged.

As illustrated in FIGS. 1 to 4, 7, and 8, the outer housing 13 is made of an insulating material such as synthetic resin having lower hardness than the shield member 11. The outer housing 13 is formed into a housing shape so as to be able to be fitted to the mating outer housing 111 therein. At an upper part in the outer housing 13, the locked portion 37 is arranged, which can engage with the lock 121 of the lock arm 123 of the mating outer housing 111. An insertion hole 39 through which the outer terminal 9 is inserted is arranged on the shield member 11 side of the outer housing 13. At an opening edge on an inner side of the insertion hole 39, an anti-detachment portion 41 is arranged which engages with an outer surface of the outer terminal 9.

At both side walls on the shield member 11 side of the outer housing 13 in the width direction, extension portions 43 extending toward the shield member 11 side are arranged. On the inner surfaces of the extension portions 43, a plurality of ribs 45 (two in this case) are arranged which extend along the fitting direction of the mating connector 101 and the connector 1 and project toward the inside. The width of each rib 45 is set to be larger than the width of each press-fit groove 35 of the shield member 11. Each rib 45 constitutes, together with each press-fit groove 35, an assembling portion 47 which maintains a state in which the shield member 11 and the outer housing 13 are assembled.

Each rib 45 is inserted into each press-fit groove 35 and press-fitted into each press-fit groove 35 by assembling the shield member 11 and the outer housing 13 along the fitting direction of the mating connector 101 and the connector 1. At this time, the outer housing 13 has lower hardness than the shield member 11, and therefore each rib 45 is press-fitted so as to be compressed by an inner surface of each press-fit groove 35. By press-fitting each rib 45 into each press-fit groove 35, the outer housing 13 and the shield member 11 are assembled, and the assembling state of the outer housing 13 and the shield member 11 is maintained. Since the hardness of the outer housing 13 is lower than that of the shield member 11, the rigidity of the outer housing 13 is lower than that of the shield member 11. However, by arranging the ribs 45 in the outer housing 13, the rigidity of the outer housing 13 can be enhanced by means of the ribs 45. The inner connection portion 15 of the inner terminal 5, the cylindrical portion 21 of the inner housing 7, and a part of the outer terminal 9 fitted to the mating outer terminal 109 are arranged inside the outer housing 13 in a state where the shield member 11 is assembled to the outer housing 13.

In this kind of assembling portion 47, each press-fit groove 35 and each rib 45 are extended along the fitting direction of the mating connector 101 and the connector 1, and each rib 45 is press-fitted into each press-fit groove 35. Therefore, a press-fit surface where each press-fit groove 35 and each rib 45 abut receives force applied when the mating connector 101 and the connector 1 are fitted or separated, or force applied when the shield wires 103 are pulled. At this time, stress that lays each rib 45 is not applied to a proximal end of each rib 45. Therefore, the proximal end of each rib

45 is not damaged, and the assembling state of the outer housing 13 and the shield member 11 can be stably maintained.

The outer housing 13 may be formed of an insulating material having higher hardness than the shield member 11. In this case, when each rib 45 is press-fitted into each press-fit groove 35, each rib 45 is press-fitted into each press-fit groove 35 such that an outer surface of each rib 45 presses an inner surface of each press-fit groove 35. In addition, if the outer housing 13 has higher hardness than the shield member 11, each rib 45 may be arranged in the shield member 11 and each press-fit groove 35 may be arranged in the outer housing 13. In this case, the rigidity of the shield member 11 can be enhanced.

In assembling this kind of connector 1, first, the shield member 11 is assembled to the outer housing 13 via the assembling portion 47. Next, the outer terminal 9 is inserted into the insertion hole 39 and the hole portion 31 of the shield member 11 from the anti-detachment portion 41 side of the insertion hole 39 until the outer terminal 9 engages with the anti-detachment portion 41 in a state before the locking portion 27 is bent. Next, the locking portion 27 of the outer terminal 9 is bent and the locking portion 27 is engaged with the opening edge of the hole portion 31. Next, the inner housing 7 holding the inner terminal 5 is housed in the shield member 11 such that the cylindrical portion 21 is housed in the outer terminal 9. The substrate connection portion 17 of the inner terminal 5 is electrically connected to the substrate 3, and the fixing portion 29 of the shield member 11 is fixed to the substrate 3.

When the connector 1 arranged on the substrate 3 is fitted to the mating connector 101, the mating outer housing 111 is fitted to the outer housing 13 such that the mating outer housing 111 is inserted into the outer housing 13. At this time, the inner terminal 5 is electrically connected to the mating inner terminal 105, and the device and the substrate 3 are electrically connected. Further, the outer terminal 9 is electrically connected to the mating outer terminal 109 and a shield circuit is formed.

This kind of connector 1 includes the outer housing 13 as a housing that can be fitted to the mating outer housing 111 as a mating housing, and the shield member 11 as an assembling member that is assembled to the outer housing 13 via the assembling portion 47. The assembling portion 47 includes each press-fit groove 35 that is arranged at the shield member 11 and extends along the fitting direction of the outer housing 13, and each rib 45 that is arranged in the outer housing 13, extends in the fitting direction of the outer housing 13, and is press-fitted into each press-fit groove 35.

Each press-fit groove 35 and each rib 45 of the assembling portion 47 extend along the fitting direction of the outer housing 13, and each rib 45 is press-fitted into each press-fit groove 35. Therefore, a press-fit surface where each press-fit groove 35 and each rib 45 abut receives force applied when the mating outer housing 111 and the outer housing 13 are fitted or separated. At this time, stress that lays each rib 45 is not applied to a proximal end of each rib 45. Therefore, a proximal end of each rib 45 is not damaged, and a press-fitted state between each rib 45 and each press-fit groove 35 is not affected.

Therefore, in this kind of connector 1, the assembling state of the outer housing 13 and the shield member 11 can be stably maintained.

The outer housing 13 and the shield member 11 have different hardness.

Therefore, when the hardness of each rib 45 and each press-fit groove 35 is different and the hardness of each rib 45 is higher, each rib 45 is press-fitted into each press-fit groove 35 in a state where an outer surface of each rib 45 presses an inner surface of each press-fit groove 35. Meanwhile, when the hardness of each rib 45 is lower, each rib 45 is press-fitted into each press-fit groove 35 in a state where each rib 45 is compressed by an inner surface of each press-fit groove 35. By making the hardness of each rib 45 and each press-fit groove 35 different in this way, each rib 45 can be stably press-fitted into each press-fit groove 35.

The shield member 11 has higher hardness than the outer housing 13.

Each press-fit groove 35 is arranged at the shield member 11. Each rib 45 is arranged in the outer housing 13. Therefore, the rigidity can be enhanced by arranging each rib 45 at the member having lower hardness.

The outer housing 13 is made of an insulating material, and the shield member 11 is made of a conductive material.

Therefore, the outer housing 13 can be used as an insulating housing member for housing electrical connection means, and the shield member 11 can be used as a shield circuit forming member for preventing the influence of noise or the like on electrical connection means.

In the connector 1 according to the present embodiment, the ribs 45 are arranged in the housing (the outer housing 13), and the press-fit grooves 35 are arranged in the assembling member (the shield member 11), but the present invention is not limited thereto. Alternatively, press-fit grooves may be arranged in the housing and ribs may be arranged at the assembling member.

In the connector 1 according to the present embodiment, the housing is the outer housing 13 made of an insulating material and the assembling member is the shield member 11 made of a conductive material, but the present invention is not limited thereto. The housing and the assembling member may be formed of any material, such as both the housing and the assembling member being made of an insulating material and being assembled via the assembling portion, for example.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A connector comprising:

a housing fittable to a mating housing, the housing comprising a rear surface along a fitting direction thereof; and an assembling member assembled to the housing via an assembling portion, wherein the housing comprises an extension portion on each side wall in a width direction of the housing, each extension portion extending from the rear surface of the housing toward the assembling member, the assembling member comprises side walls in a width direction of the assembling member, each side wall of the assembling member facing an inner surface of each extension portion of the housing, and the assembling portion includes:

a press-fit groove arranged in an outer surface of each side wall of the assembling member as a depressed portion and extending along the fitting direction of the housing; and a rib arranged at each extension portion of the housing, extending in the fitting direction of the housing, and press-fitted into the press-fit groove.

2. The connector according to claim 1, wherein a hardness of the housing and a hardness of the assembling member are different from each other.

3. The connector according to claim 1, wherein a hardness of one of the housing and the assembling member is higher than a hardness of the other of the housing and the assembling member.

4. The connector according to claim 1, wherein the housing is made of an insulating material, and the assembling member is made of a conductive material.

* * * * *